(No Model.)

G. H. P. FLAGG.

ROLL FOR BUFFING OR POLISHING MACHINES.

No. 254,811. Patented Mar. 14, 1882.

Attest:
Wm. Zittel.
John R. Snow.

Inventor
George H. P. Flagg
by J. R. Maynadier
his Atty.

UNITED STATES PATENT OFFICE.

GEORGE H. P. FLAGG, OF BOSTON, MASSACHUSETTS.

ROLL FOR BUFFING OR POLISHING MACHINES.

SPECIFICATION forming part of Letters Patent No. 254,811, dated March 14, 1882.

Application filed February 3, 1882. (No model.)

*To all whom it may concern:*

Be it known that I, GEORGE H. P. FLAGG, of Boston, in the county of Suffolk and State of Massachusetts, have invented an Improved Roll for Buffing and Polishing Machines, of which the following is a full, clear, concise, and exact description, reference being had to the accompanying drawings, making a part hereof, in which—

Figure 1:
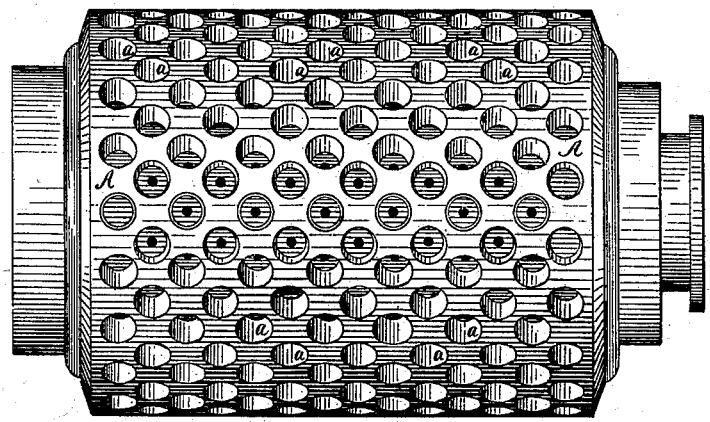
Figure 2:
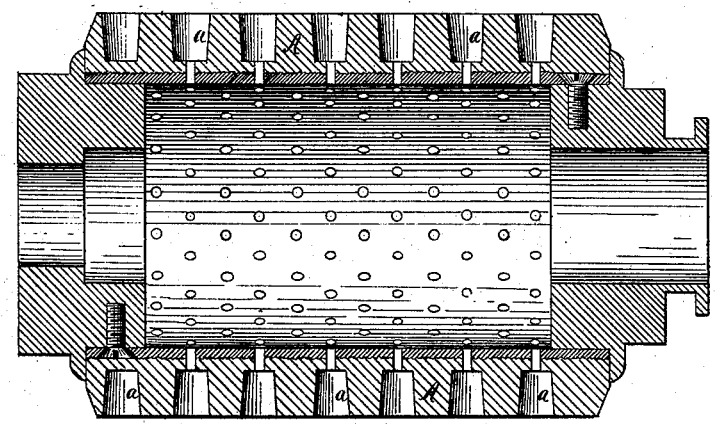
Figure 3:
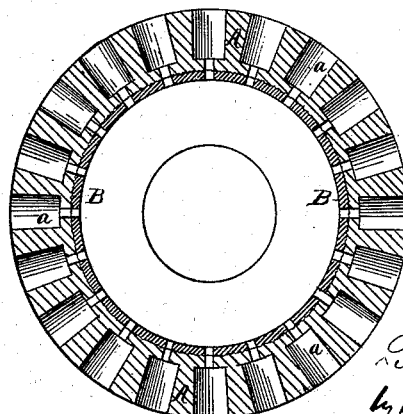

Figure 1 is a plan, Fig. 2 is a lengthwise section, and Fig. 3 a cross-section, of one of my improved rolls.

In my application for Letters Patent allowed January 16, 1882, I have described a cellular rubber covering for rolls of this class; and my present invention relates to rolls with that kind of covering, and consists in a new mode of manufacturing such rolls. Rolls of this kind are usually run at a very high speed—two thousand revolutions per minute or more—and my rolls are commonly run about five thousand, and hence require to be trued with considerable exactness. When the rubber covering A, with the cells $a$ in it, is molded on its core, it is very difficult to make the roll sufficiently true for very high speed, and my invention is designed to remedy this difficulty, and consists in making the roll by first affixing the rubber covering A, then turning the roll, and after the roll has been thus turned forming the cells $a$ in the rubber covering. If the cells be formed before the turning of the roll, it is very difficult to get the covering true, because the tool used will be very apt to mar the corners of the rubber around the cells. This difficulty is indeed so great that I have found it impossible to true a roll exactly after the rubber covering filled with cells was applied to it.

The roll shown in the drawings was made as follows: The core B was first covered with unvulcanized rubber at the rubber-factory, and the rubber then vulcanized, all in the usual way, the vulcanized covering A being then without the cells $a$. The rolls thus prepared are considerably out of true, and the coverings A are carefully turned down until the rolls are true. This is easily done by mounting each roll so that it can be rapidly revolved, and while it is revolving using a file or the like on the surface of the covering A, and finishing up with fine sand-paper, so as to make it exactly cylindrical. After this is done the cells $a$ are formed by means of a revolving tubular cutter supplied with water, as is usual in cutting rubber, and making a circular cut to the proper depth. The core is then pulled out by means of pinchers and pulled or cut off, leaving the cell $a$. In this way the cellular covering can be made very true and well adapted for rolls which are to be run at a very high speed.

I find in practice that my improved rolls give out a disagreeable whistling sound when in use unless the cells have a small vent-hole; and I therefore perforate the rubber covering and the core of the roll, as shown in the drawings. These perforations do not affect the working of the roll, but prevent the sound above referred to, and are therefore a matter of some importance. Of course only those cells need to be vented which are covered by the sand-paper.

What I claim as my invention is—

1. The process above described for making rolls with a cellular rubber covering, consisting in first applying the covering A to the core B; secondly, truing the covering, and then forming the cells $a$.

2. The improved roll above described, consisting of the core B, rubber covering A, having the cells $a$ formed in it, and the cells provided with vents, substantially as and for the purpose specified.

GEORGE H. P. FLAGG.

Witnesses:
WM. A. COPELAND,
JOHN R. SNOW.